US010749770B2

(12) United States Patent
Kohout et al.

(10) Patent No.: US 10,749,770 B2
(45) Date of Patent: Aug. 18, 2020

(54) CLASSIFICATION OF IOT DEVICES BASED ON THEIR NETWORK TRAFFIC

(71) Applicant: Cisco Technology, Inc., San Jose, CA (US)

(72) Inventors: Jan Kohout, Roudnice Nad Labem (CZ); Martin Grill, Prague (CZ); Martin Kopp, Beroun (CZ); Lukas Bajer, Liberec (CZ)

(73) Assignee: Cisco Technology, Inc., San Jose, CA (US)

( * ) Notice: Subject to any disclaimer, the term of this patent is extended or adjusted under 35 U.S.C. 154(b) by 17 days.

(21) Appl. No.: 16/156,020

(22) Filed: Oct. 10, 2018

(65) Prior Publication Data

US 2020/0120004 A1    Apr. 16, 2020

(51) Int. Cl.
H04L 12/28 (2006.01)
H04L 12/26 (2006.01)
H04L 12/851 (2013.01)

(52) U.S. Cl.
CPC ........ H04L 43/065 (2013.01); H04L 43/0876 (2013.01); H04L 47/2441 (2013.01)

(58) Field of Classification Search
None
See application file for complete search history.

(56) References Cited

U.S. PATENT DOCUMENTS

| 7,813,822 | B1 * | 10/2010 | Hoffberg | G06K 9/00369 381/73.1 |
| 8,451,731 | B1 * | 5/2013 | Lee | H04L 43/026 370/235 |
| 9,197,498 | B2 | 11/2015 | Chambers et al. | |
| 9,203,689 | B2 | 12/2015 | Nahum et al. | |
| 9,253,015 | B2 * | 2/2016 | Girard | H04L 45/245 |
| 9,705,762 | B2 | 7/2017 | Parthasarathy et al. | |
| 9,836,183 | B1 * | 12/2017 | Love | G06T 11/206 |
| 2007/0043565 | A1 * | 2/2007 | Aggarwal | G10L 15/063 704/245 |
| 2007/0280114 | A1 * | 12/2007 | Chao | H04L 43/0888 370/235.1 |

(Continued)

OTHER PUBLICATIONS

Liebman et al. "Representative Selection in Non Metric Datasets" Computer Science Department; arXiv:1502.07428v2 [cs.AI] Jun. 19, 2015; pp. 1-31.

(Continued)

Primary Examiner — Elisabeth Benoit Magloire
(74) Attorney, Agent, or Firm — Behmke Innovation Group LLC; Kenneth J. Heywood; Jonathon P. Western

(57) ABSTRACT

In one embodiment, a traffic analysis service obtains telemetry data regarding network traffic associated with a device in a network. The traffic analysis service forms a histogram of frequencies of the traffic features from the telemetry data for the device. The traffic features are indicative of endpoints with which the device communicated. The traffic analysis service associates a device type with the device, by comparing the histogram of the traffic features from the telemetry data to histograms of traffic features associated with other devices. The traffic analysis service initiates, based on the device type associated with the device, an adjustment to treatment of the traffic associated with the device by the network.

20 Claims, 15 Drawing Sheets

(56) References Cited

U.S. PATENT DOCUMENTS

| | | | | |
|---|---|---|---|---|
| 2012/0254388 | A1* | 10/2012 | Duxbury | H04L 43/026 709/223 |
| 2014/0293091 | A1* | 10/2014 | Rhoads | G01J 3/513 348/234 |
| 2014/0324748 | A1* | 10/2014 | Modica | G08G 1/123 706/20 |
| 2015/0286873 | A1* | 10/2015 | Davis | G06F 3/013 382/103 |
| 2016/0173450 | A1 | 6/2016 | Mircescu et al. | |
| 2017/0279829 | A1 | 9/2017 | Vasseur et al. | |

OTHER PUBLICATIONS https://en.wikipedia.org/wiki/K-medoids; k-medoids—Wikipedia; pp. 1-5.
Bauckhage et al. "k-Maxoids Clustering" http://mmprec.iais.fraunhofer.de/bauckhage.html; pp. 1-12.
Brandes et al. "On Modularity Clustering" pp. 1-15.

\* cited by examiner

CLASSIFICATION OF IOT DEVICES BASED ON THEIR NETWORK TRAFFIC

TECHNICAL FIELD

The present disclosure relates generally to computer networks, and, more particularly, to the classification of Internet of Things (IoT) devices based on their network traffic.

BACKGROUND

An emerging area of interest in the field of computer networking is the "Internet of Things" (IoT), which may be used by those in the art to refer to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, window shades and blinds, doors, locks, etc.

As more non-traditional devices join the IoT, networks may eventually evolve from a bring-your-own-device (BYOD) model to a model that enables bring-your-own-thing (BYOT), bring-your-own-interface (BYOI), and/or bring-your-own-service (BYOS) paradigms. In other words, as the IoT grows, the number of available services, etc., will also grow considerably. For example, a single person in the future may transport sensor-equipped clothing, other portable electronic devices (e.g., cell phones, etc.), cameras, pedometers, or the like, into an enterprise environment, each of which may attempt to access the wealth of new IoT services that are available on the network.

From a networking perspective, the network can automatically configure access control policies, other security policies, and the like, if the device type of a particular IoT device is known to the network. For example, the network may limit a particular type of sensor to only communicating with its supervisory. However, with the ever-increasing number and variety of IoT devices, it may also be the case that the device type is not initially known to the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
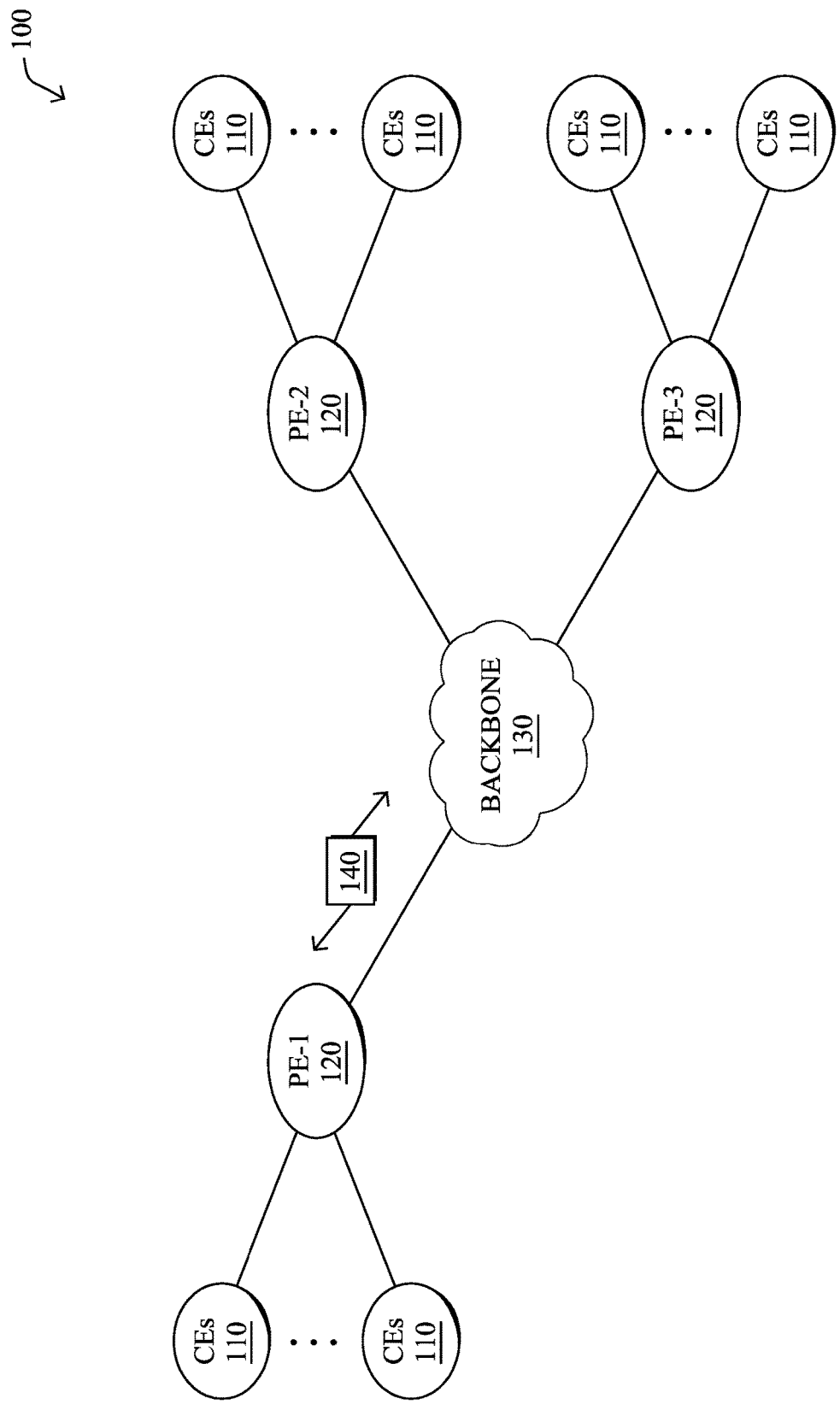
FIGS. 1A-1B illustrate an example communication network.

According to one or more embodiments of the disclosure, a traffic analysis service obtains telemetry data regarding network traffic associated with a device in a network. The traffic analysis service forms a histogram of frequencies of the traffic features from the telemetry data for the device. The traffic features are indicative of endpoints with which the device communicated. The traffic analysis service associates a device type with the device, by comparing the histogram of the traffic features from the telemetry data to histograms of traffic features associated with other devices. The traffic analysis service initiates, based on the device type associated with the device, an adjustment to treatment of the traffic associated with the device by the network.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
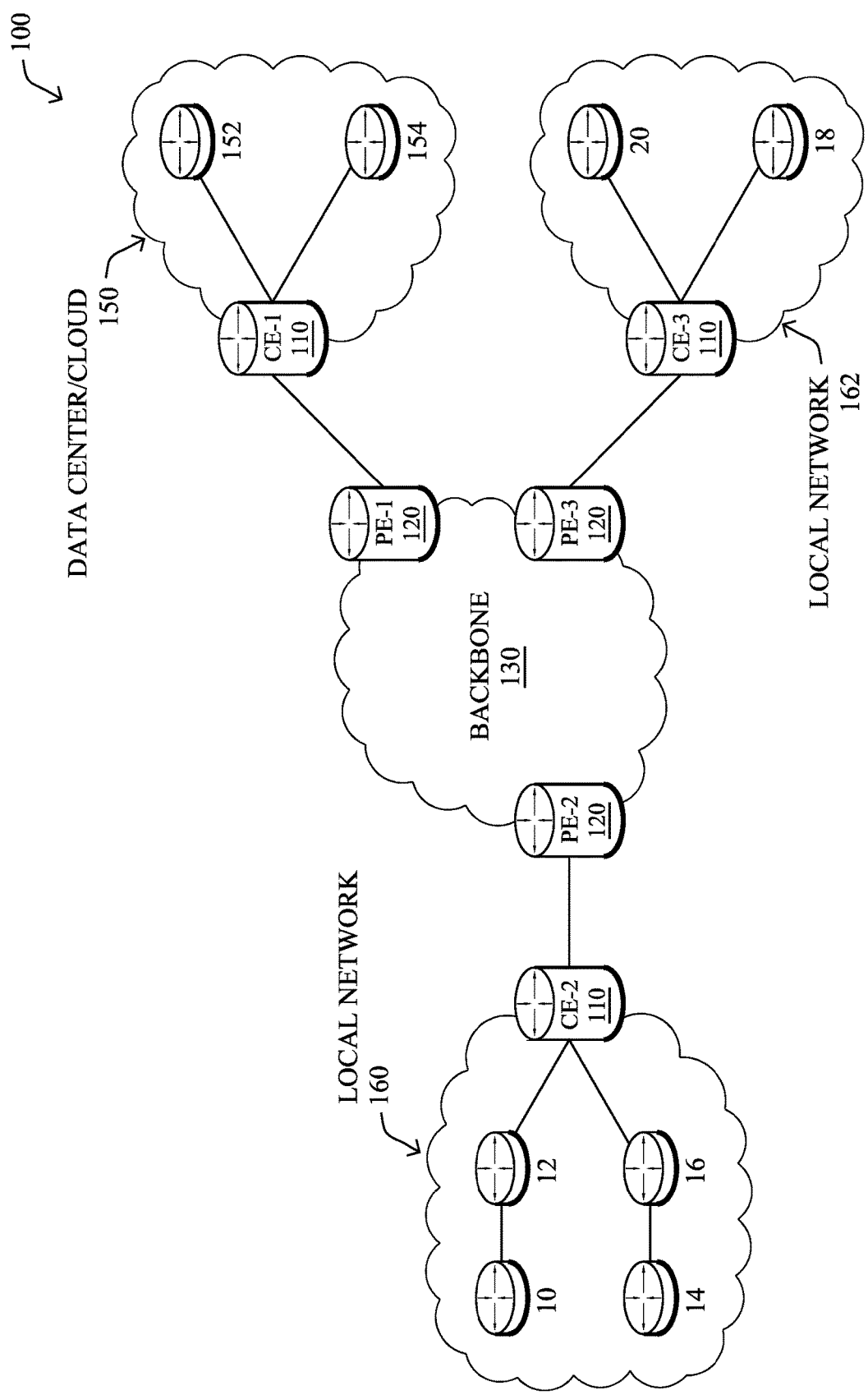

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
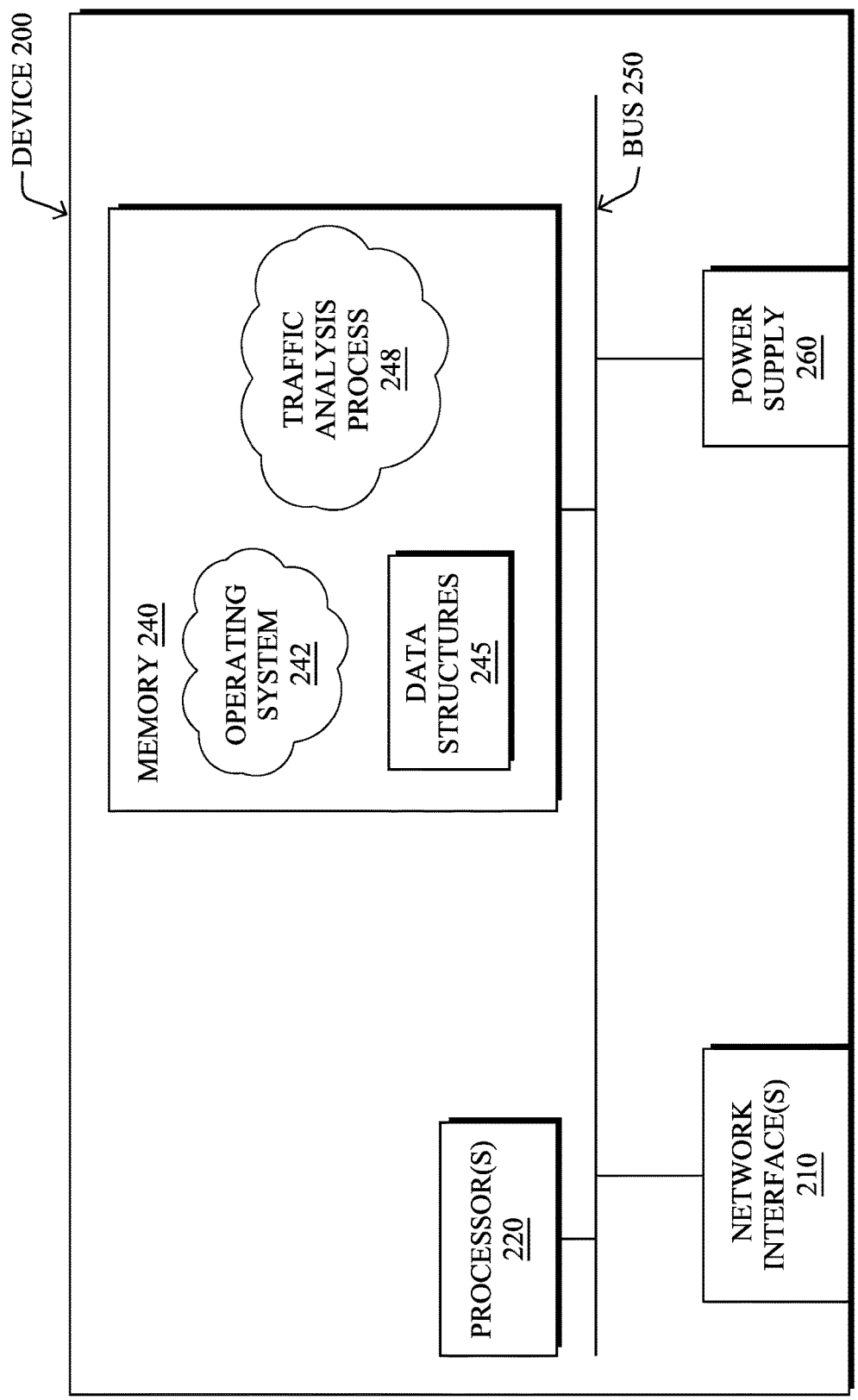
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154

(e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a traffic analysis process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, traffic analysis process 248 may execute one or more machine learning-based classifiers to classify a device in a network, based on its corresponding network traffic. In one embodiment, traffic analysis process 248 may assess captured telemetry data regarding one or more traffic flows involving the device, to determine the device type associated with the device. In further embodiments, traffic analysis process 248 may classify the operating system of the device, based on its captured traffic telemetry data.

Traffic analysis process 248 may employ any number of machine learning techniques, to classify the gathered telemetry data. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, traffic analysis process 248 can use the model M to classify new data points, such as information regarding new traffic flows in the network. Often, M is a statistical model, and the cost function is inversely proportional to the likelihood of M, given the input data.

In various embodiments, traffic analysis process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is labeled as "iPhone 6," or "iOS 10.2." On the other end of the spectrum are unsupervised techniques that do not require a training set of labels. Notably, while a supervised learning model may look for previously seen patterns that have been labeled as such, an unsupervised model may attempt to analyze the data without applying a label to it. For example, supervised learning can be used to cluster devices that behave similarly to one another, based on their captured telemetry data. Semi-supervised learning models take a middle ground approach that uses a greatly reduced set of labeled training data.

Example machine learning techniques that traffic analysis process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as associated with a particular device type (e.g., make and/or model number, operating system, etc.). Conversely, the false negatives of the model may refer to the number of traffic flows that the model incorrectly classifies as belonging to a certain device type. True negatives and positives may refer to the number of traffic flows that the model correctly classifies as not being of a certain class or being of a certain class, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, traffic analysis process 248 may assess the captured telemetry data on a per-flow basis. In other embodiments, traffic analysis process 248 may assess telemetry data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

Figure 3:
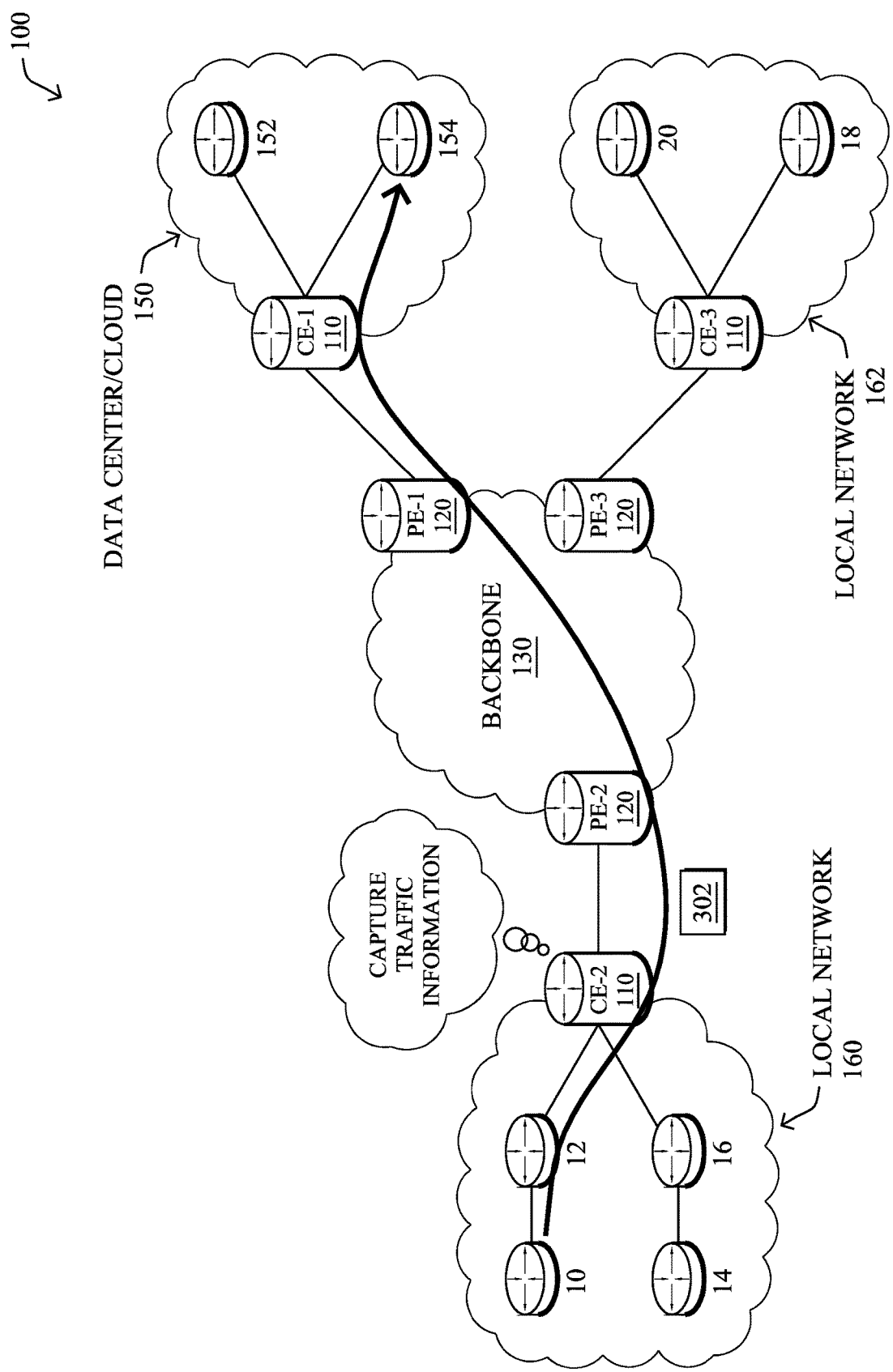
FIG. 3 illustrates an example of the capture of traffic telemetry data.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture feature information about the traffic flow. For example, router CE-2 may capture the source address and/or port of host node 10, the destination address and/or port of server 154, the protocol(s) used by packet 302, the hostname of server 154, and/or other header information by analyzing the header of a packet 302. Example captured features may include, but are not limited to, Transport Layer Security (TLS) information (e.g., from a TLS handshake), such as the ciphersuite offered, User Agent information, destination hostname, TLS extensions, etc., HTTP information (e.g., URI, etc.), Domain Name System (DNS) information, ApplicationID, virtual LAN (VLAN) ID, or any other data features that can be extracted from the observed traffic flow(s). Further information, if available could also include process hash information from the process on host node 10 that participates in the traffic flow.

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302.

As noted above, with the proliferation of IoT devices and the bring-your-own-device (BYOD) approach, it is very difficult for an administrator to provide detailed information about each device connected to the network, such as its device type (e.g., printer, iPhone, tablet, iOS 10 device, etc.). Because of the dynamic nature of modern networks, this type of information is not static and cannot be handled manually. However, such detailed information may be needed for proper assessment of security incidents involving a particular device, to apply a network access policy to the device, for purposes of traffic shaping of traffic involving the device, and other network operations.

Classification of IoT Devices Based on Their Network Traffic

The techniques herein allow for the automatic identification of the types of IoT devices on a network, such as their makes, models, OS, etc. The system works in a passive way and can consume relatively lightweight traces of network traffic, such as IPFIX records, NetFlow records, web proxy logs, or the like. In particular, the system is able to infer the device type of a device on the network based on its observed traffic, without requiring the system to scan the device or the device to provide any additional self-identification data. In some aspects, the device identification may be based on the frequencies of the observed traffic features, such as visited domains, applications used by the device, etc.

Specifically, according to one or more embodiments of the disclosure as described in detail below, a traffic analysis service obtains telemetry data regarding network traffic associated with a device in a network. The traffic analysis service forms a histogram of frequencies of the traffic features from the telemetry data for the device. The traffic features are indicative of endpoints with which the device communicated. The traffic analysis service associates a device type with the device, by comparing the histogram of the traffic features from the telemetry data to histograms of traffic features associated with other devices. The traffic analysis service initiates, based on the device type associated with the device, an adjustment to treatment of the traffic associated with the device by the network.

Illustratively, the techniques described herein may be performed by hardware, software, and/or firmware, such as in accordance with the traffic analysis process 248, which may include computer executable instructions executed by the processor 220 (or independent processor of interfaces 210) to perform functions relating to the techniques described herein.

Operationally, as noted, an administrator of a corporate network is usually able to identify the device type/OS of only a fraction of the devices connected to the network. Typically, the identifiable devices have manually assigned IP addresses, or a range of IP addresses, and serve a specific purpose. However, devices in the dynamically assigned addresses ranges (e.g., guest networks, user networks, BYOD networks, etc.) cannot be tracked and identified in this way.

In general, the techniques herein allow for the generation of a high-level device profile from network traces (e.g., web proxy logs, NetFlow records, etc.) for a particular device type that is independent of the specific network environment and can be shared among individual networks. Such a behavioral profile is also referred to herein as a prototype and can be used to classify unknown devices. Notably, a device type can be associated with the unknown device based on the type associated with its nearest prototype, if its similarity is below a predefined threshold for some applicable similarity (e.g., cosine similarity, Euclidean measure, etc.).

According to various embodiments, the traffic analysis service may represent the behavioral profile of a device under scrutiny as a histogram of frequencies of individual feature values extracted from the traffic telemetry data captured for the device. Example features from the traffic telemetry data may include, but are not limited to, the contacted server hostname, the server IP, the server IP+server port, ApplicationID (as parsed by firewalls), User-Agent string (for web access logs), process hash, etc. that was used by the monitored device.

Figure 4:
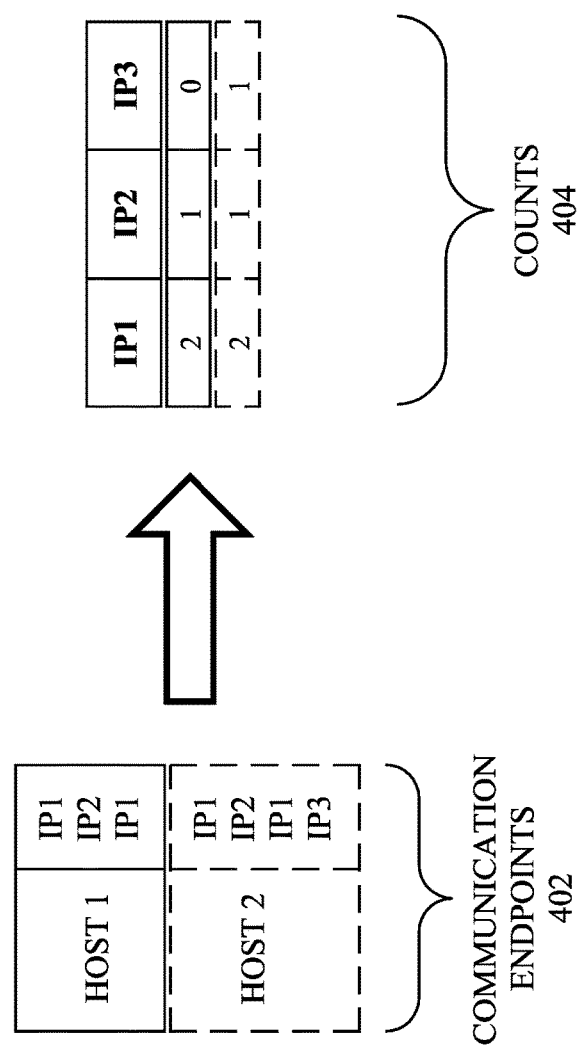
FIG. 4 illustrates an example of analyzing captured traffic telemetry data.

FIG. 4 illustrates an example 400 of analyzing captured traffic telemetry data, in some embodiments. For illustrative purposes, the telemetry data feature shown is the IP addresses of the servers contacted by the devices to be classified, 'Host 1' and 'Host 2.' However, as would be appreciated, the techniques shown can be used on any or all of the possible traffic features that can be extracted from the captured traffic telemetry data.

As shown, the traffic telemetry data may indicate the communication endpoints involved in the observed network traffic, such as identifiers for the local hosts to be classified (e.g., Host 1, Host 2, etc.) and identifiers for the server(s) with which the hosts communicated (e.g., the domains, IP addresses, ports, etc.). In various embodiments, the traffic analysis service may use a binning approach, to determine counts 404 of the number of times a given host communicated with a specific endpoint within a specified time period. For example, the service may assess the server IPs contacted by each host within the last 24 hours or another desired span of time.

The value of a histogram bin may represent the frequency of the usage of that particular feature value by the device to be classified, in various embodiments. For example, as shown, assume that Host 1 contacted the server at IP address IP1 twice and the server at IP address IP2 once, within the analysis time window. Similarly, assume that Host 2 contacted the server at IP1 twice, the server at IP2 once, and the sever at IP address IP3 once, during the same time window.

From counts 404, the traffic analysis service can calculate the frequencies as a ratio of amount of time slots in which the specific server IP was contacted by the host to the total number of time slots in which the host was active, in various embodiments. Doing so results in a much more robust representation of the behavior of the device than a histogram of visits that emphasizes the persistent behavior of the device. Note also that the histograms for the prototypes can also be formed across multiple dimensions/traffic features, in some cases.

The operating system of a device represents one potential delineation between different device types. For example, the techniques herein can be used to classify whether a device in a network is running the Windows operating system, the iOS operating system, or another operating system, such as Linux. The basic idea here is that there are some specific domains/hostnames/IPs for each family of operating systems that are periodically contacted by each running instance of OS from the given family. Therefore, a type of operating system can be inferred using the frequencies of communication with these specific domains. These specific domains may include, for example, windowsupdate.com, msftncsi.com, apple.com, icloud.com etc. All the specific domains are listed in a predefined dictionary or they can be even revealed automatically on-the-fly.

During operation, the traffic analysis service may infer the operating system of an unknown device by measuring the similarity of the behavioral profile of the device to the prototype of individual OSes. Then, the service may flag the OS of the device as being of a certain type according to the OS of the most similar prototype device (e.g., if the similarity is below a predefined threshold).

Figure 5:
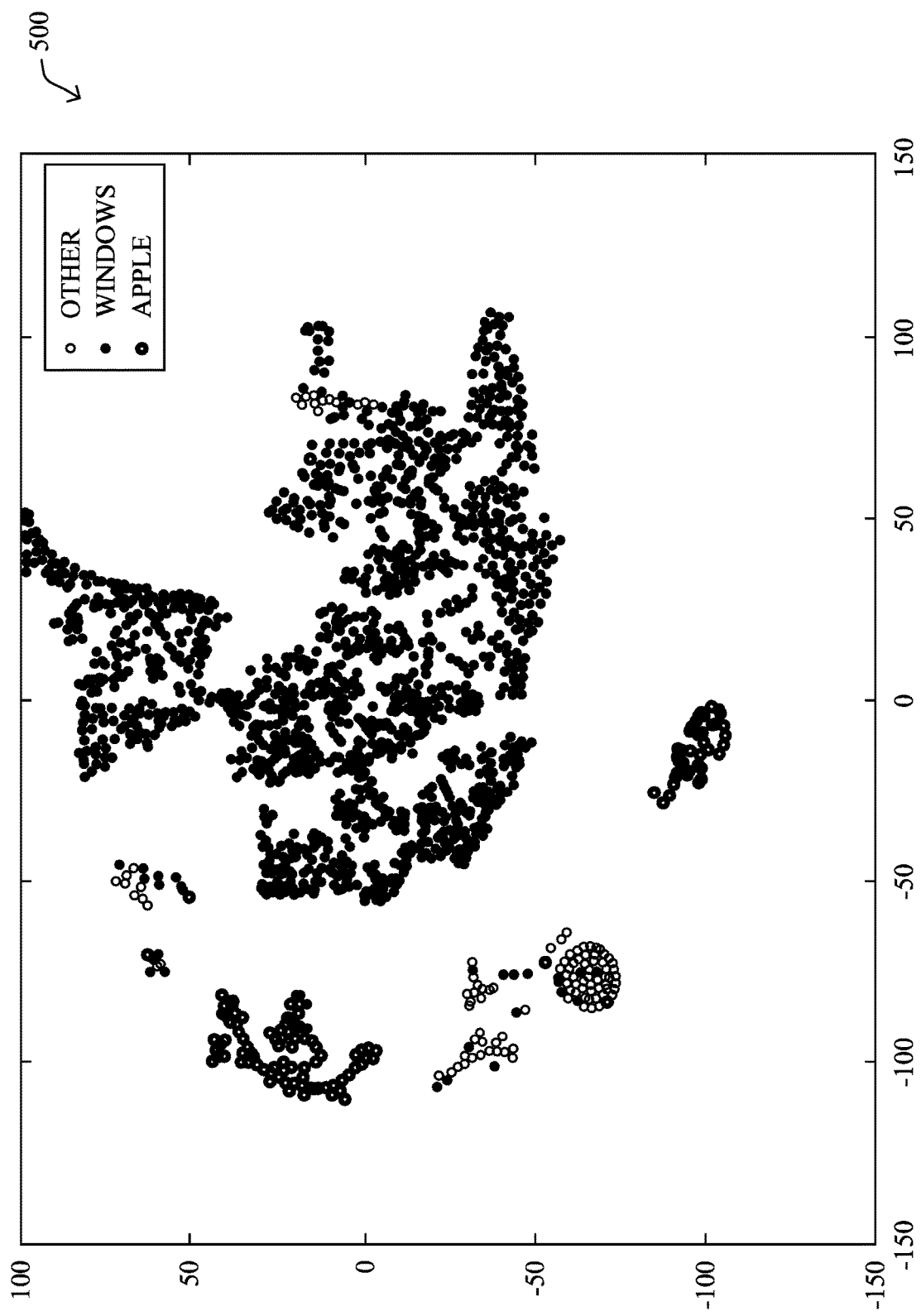
FIG. 5 illustrates an example of plot of device profiles by operating system.

FIG. 5 illustrates an example plot 500 of device profiles by operating system, in some embodiments. As shown, three categories of device types were assessed: 1.) devices running the Windows OS, 2.) devices running Apple's OS, and 3.) devices running another OS. The device profiles were formed based on the domains accessed by the observed devices during a predefined period of time. From plot 500, it can be seen that the different devices exhibit different groups of traffic behaviors, allowing for the creation of prototype behaviors that can be used to classify new devices.

Note that the techniques herein take a dynamic approach to device classification, as opposed to statically assessing whether the accessed domains are associated with a particular classification. For example, while it may be possible to simply classify a device that accesses Apple's update servers as an iOS device, such a naïve approach is also prone to errors. For example, a Windows-based machine with iTunes installed could lead to false detection of the device as an iOS device. In contrast, the techniques herein are able to automatically infer the significant domains/hostnames or other features for any newly introduced device types to the network.

In various embodiments, the traffic analysis service may construct the prototypes from the device behavioral data (e.g., histograms of traffic telemetry data features) by leveraging unsupervised machine learning. Notably, the service may use a clustering approach, to extract out the relevant prototypes. In turn, each prototype can be labeled with its associated device type, such as by providing data regarding a given device cluster to a user interface and receiving a device type label from an expert via the interface.

Figure 6A:
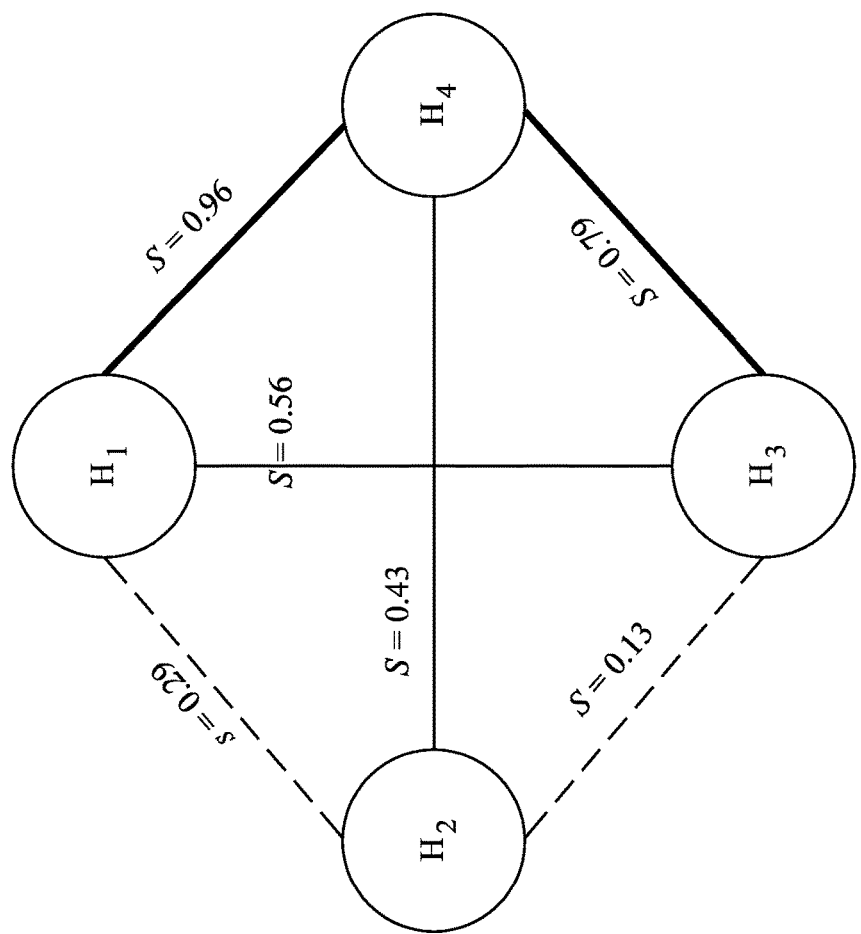
FIGS. 6A-6D illustrate an example of clustering device behaviors.

In some embodiments, to cluster the network devices into groups based on their behaviors, the traffic analysis service may first build a similarity graph whereby nodes represent the internal network devices. An example of the clustering of device behaviors is shown in FIGS. 6A-6D. As shown in FIG. 6A, assume that there are four host devices in the network: devices $H_1$-$H_4$ with their behavioral profiles represented as nodes in graph 600.

Also as shown in FIG. 6A are pairwise similarity measures that the traffic analysis service may compute between the nodes of graph 600 (e.g., between the histograms associated with the devices). In turn, the similarity measures may be used to weight the edges between the corresponding nodes of graph 600. Any number of similarity measures can be used, in various embodiments. For example, the pairwise similarity of device profiles A and B can be computed as follows:

$$\cos(\theta) = \frac{A \cdot B}{\|A\|\|B\|} = \frac{\sum_{i=1}^{n} A_i \times B_i}{\sqrt{\sum_{i=1}^{n}(A_i)^2} \times \sqrt{\sum_{i=1}^{n}(B_i)^2}}$$

Figure 6B:
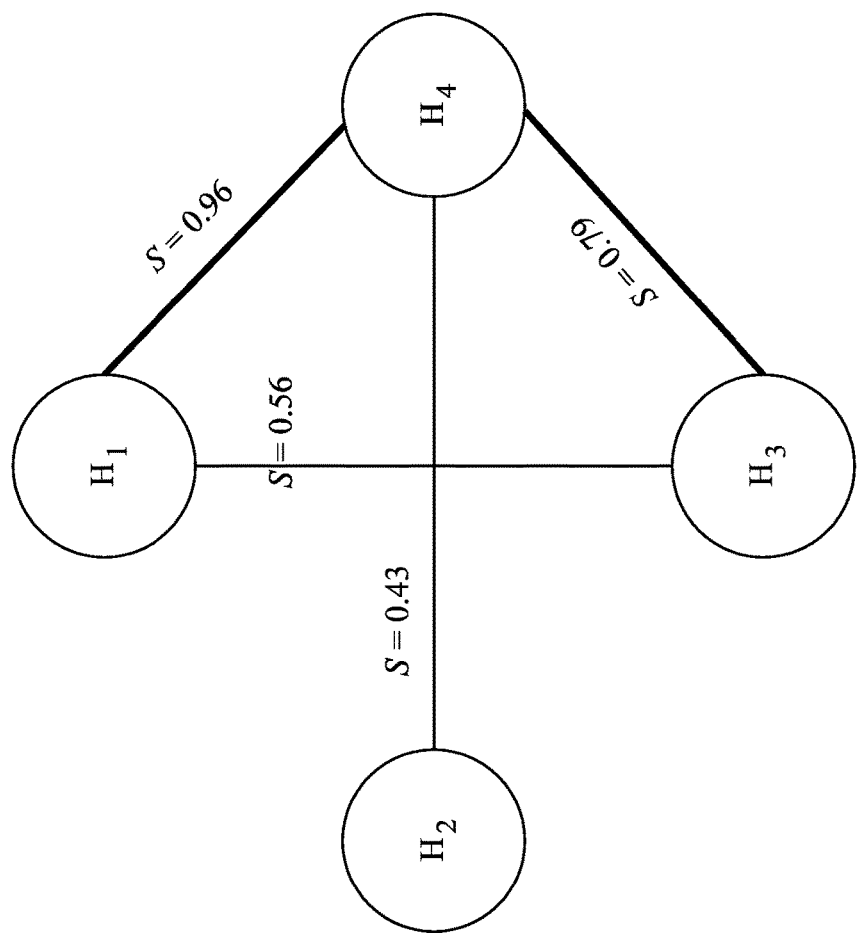

After constructing a fully connected graph, the traffic analysis service may then prune edges from graph 600 that have similarity scores below a predefined threshold, as shown in FIG. 6B. For example, the similarity measure between the histograms of devices $H_3$ and $H_4$ is S=0.13 and can be flagged for pruning. In contrast, the similarity measure between the histograms of devices $H_1$ and $H_2$ is S=0.96, indicating that the two devices have very similar behaviors. By pruning the low similarity edges from graph 600, homogeneous groups of devices are formed, reducing the computational complexity.

Figure 6C:
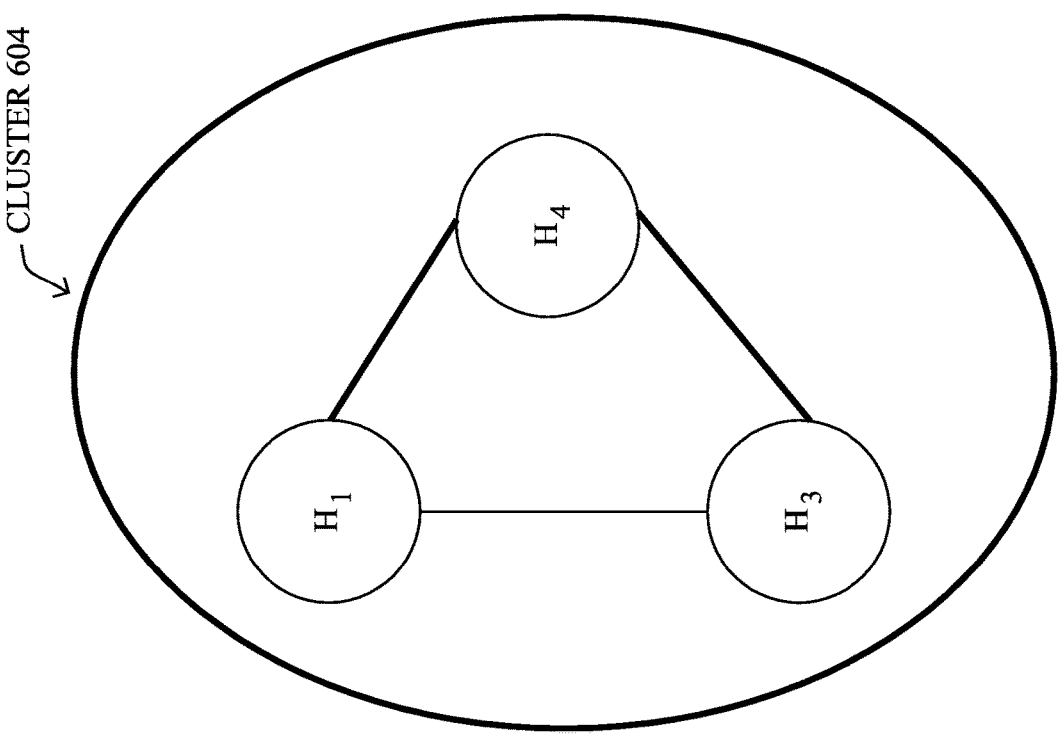
Figure 6C:
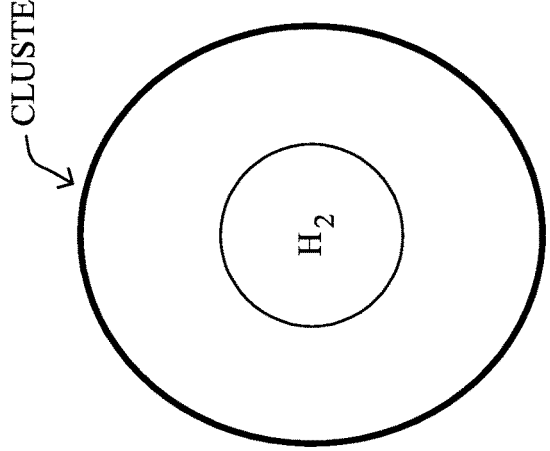

Once the low similarity edges of graph 600 are pruned, the traffic analysis service may then cluster the devices, as shown in FIG. 6C. Notably, as shown, since device $H_2$ is no longer connected to any other node in graph 600, it may form its own device cluster 602. Conversely, as devices $H_2$, $H_3$, and $H_4$ are still interconnected, they may form a second device cluster 604. In some embodiments, the traffic analysis service may leverage Modularity clustering, also known as graph community detection, to perform the clustering. In general, this approach seeks to identify densely connected groups.

Once the traffic analysis service has identified the various device clusters, it may form a small set of representations (medoids) of each cluster. In turn, in some embodiments, the service may present information about the medoids and/or clusters to an expert user for labeling. For example, the user may be asked to label a device cluster as being associated with iPhones, Android phones, or another form of device.

Once labeled, the service can then use the labeled medoids as new prototypes for the classification. Notably, a new device under scrutiny may be labeled with the label of its most similar prototype.

Figure 6D:
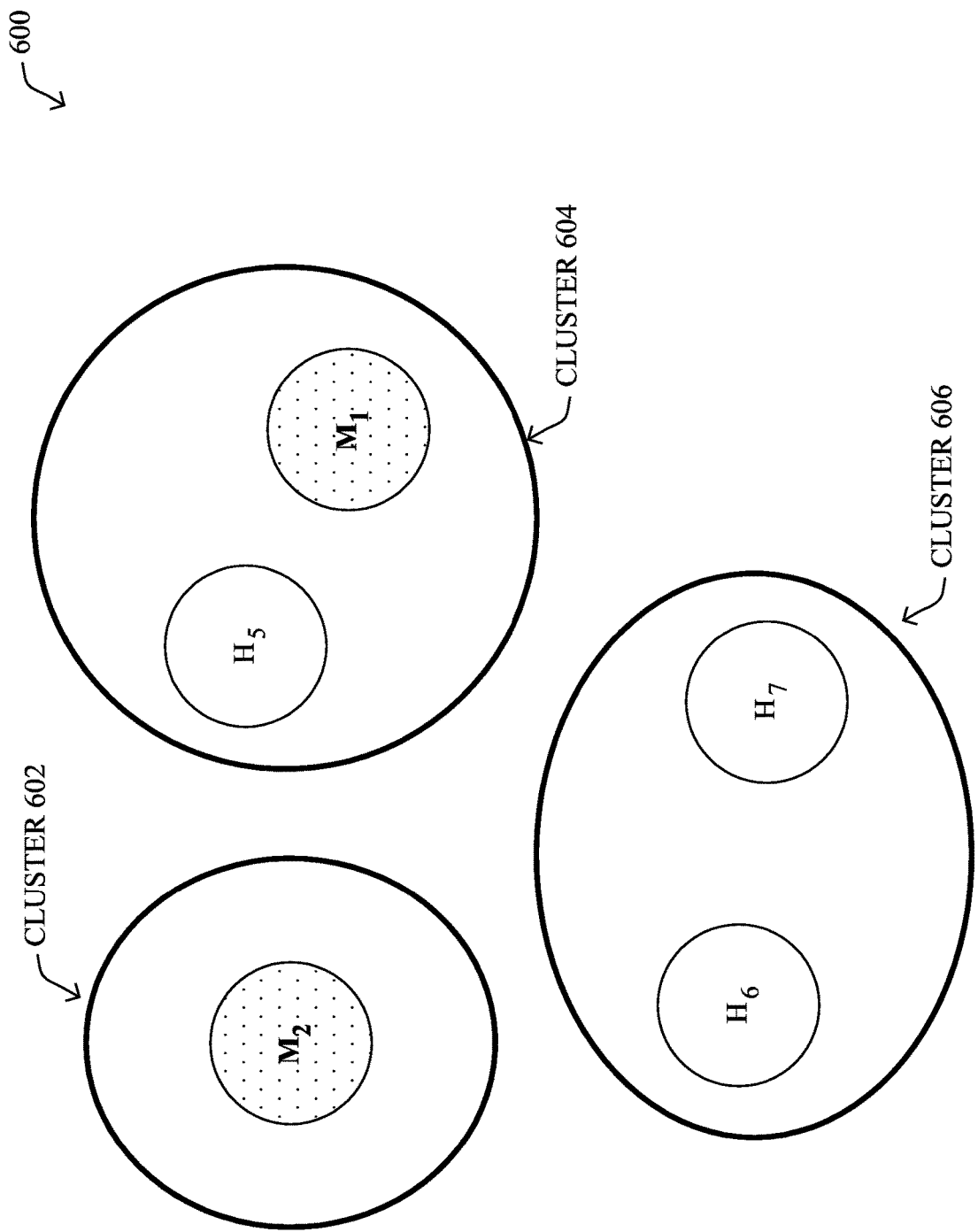

When the traffic analysis service updates the device clusters, instead of re-computing the entire graph from scratch, it may simply use the medoids to represent the nodes of their corresponding clusters. For example, as shown in FIG. 6D, assume that the traffic analysis service has computed medoids $M_1$ and $M_2$, to represent device clusters 604 and 602, respectively. Now, assume that the service has computed behavioral profiles for new devices $H_5$, $H_6$, and $H_7$ and represents them as new nodes in graph 600. In turn, the service may take a similar approach to the initial device cluster formations by calculating the pairwise similarities between the new nodes, as well as with the mediod representations of device clusters 602-604 and prune the edges with similarity measures below the defined threshold. As a result, as shown, a new device cluster 606 is formed from $H_6$, and $H_7$. Since $H_5$ is deemed similar to medoid $M_1$, it may be considered to be part of device cluster 604.

Figure 7A:
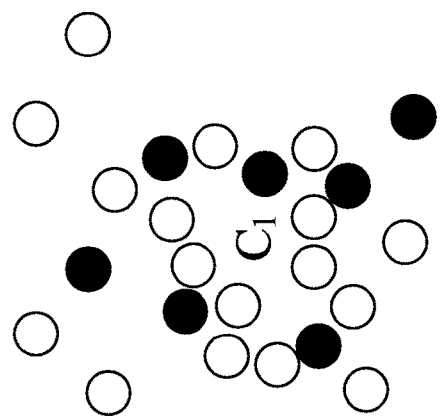
FIGS. 7A-7C illustrate examples of different cluster representation approaches.
Figure 7A:
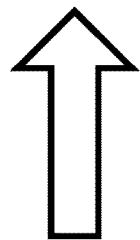
Figure 7A:
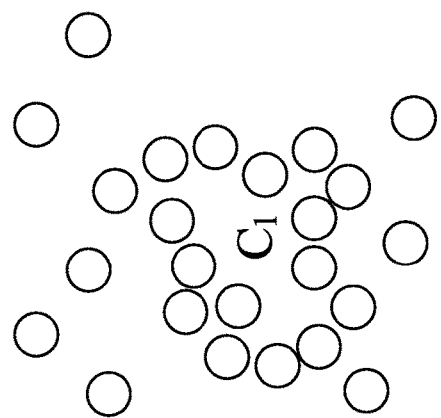
Figure 7B:
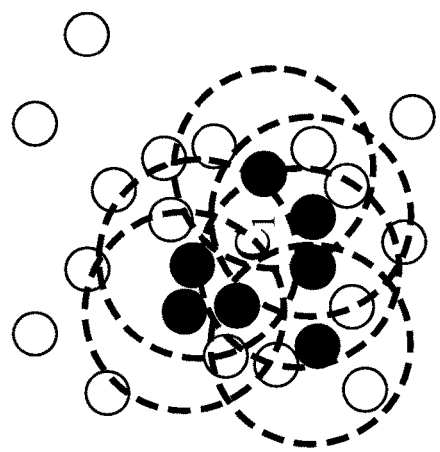
Figure 7B:
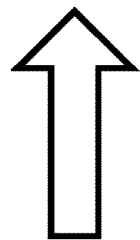
Figure 7B:
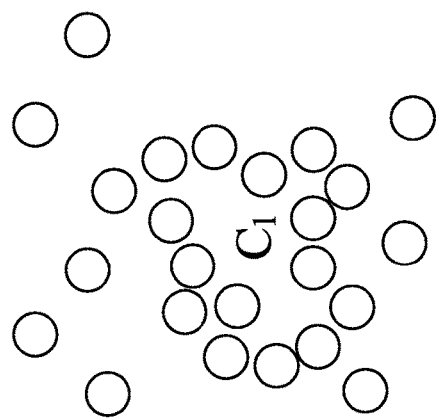
Figure 7C:
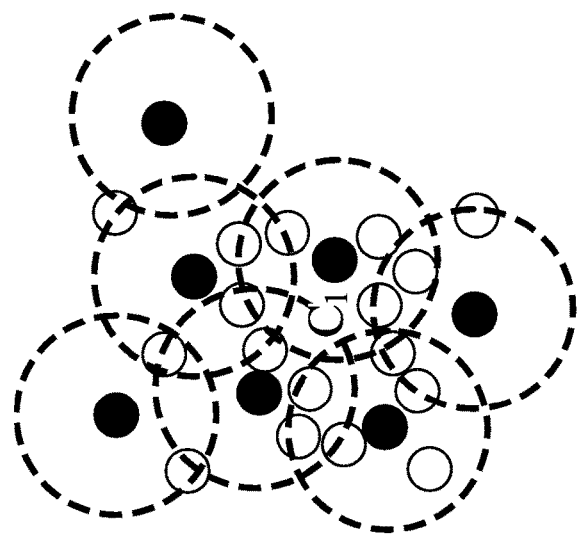
Figure 7C:
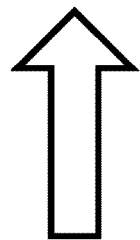
Figure 7C:
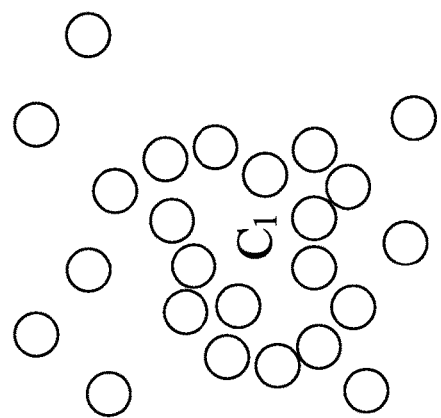

The traffic analysis service may represent device clusters in any number of different ways. For example, FIGS. 7A-7C illustrate examples of different cluster representation approaches that the service may employ. In a simple approach, as shown in example 700 of FIG. 7A, the service may simply select the medoids randomly. In FIG. 7B, another example is shown whereby the medoids are formed using a k-medoids approach. In contrast to k-means approaches, which seek to minimize the total squared error (e.g., sum of squared Euclidean distances), a k-medoid approach seeks to identify the data point in a cluster that minimizes sum of pairwise dissimilarities, as computed below:

$$\text{medoid} = \text{argmin}_{y \in \{v_1 \ldots v_n\}} \Sigma_1^n d(y, v_i)$$

where $d(y, v_i)$ is the pairwise dissimilarity between points y and $v_i$.

In various embodiments, the traffic analysis service may instead leverage a δ-medoid approach, as shown in example 720 in FIG. 7C, in which a delta (δ) distance from a medoid is represented by a shaded circle around the medoid. More specifically, this approach may entail performing the following:

1. Find the medoid and mark it as the first representative
2. Remove all points that lay in its delta distance
3. Search for medoid in the reduced set and mark it as representative
4. Remove all points that lay in its delta distance
5. Repeat steps 3-4 until the entire set is covered Another way to understand this approach is as follows:
1. Start with a medoid as a first representative
2. Look for points that are further than delta distance from that medoid
3. If a point is found, mark it as a representative
4. Repeat steps 2-3 until there are no points left In other words, the δ-medoid approach introduced herein takes an iterative optimization approach, similar to Expectation-Maximization algorithm, which ensures that a representative is "best-fit," on average, to the cluster of samples that it represents and without sacrificing coverage. Notably, some approaches to cluster representation are naturally unstable as their results depend on the ordering of the data. Here, however, the δ-medoid approach attempts to minimize the size of the representative set and also tends to keep the average distance as low as possible. This drastically improves the stability of the retrieved representative set under different permutations of the data. It also ensures that more representatives than twice the optimal solution are selected.

Note also that the δ-medoid approach is particularly suited for larger datasets, as the service may not have sufficient memory resources to process the entire dataset. Of course, for smaller datasets, less sophisticated approaches can be taken, such as random selection, greedy selection, or the like.

Figure 8:
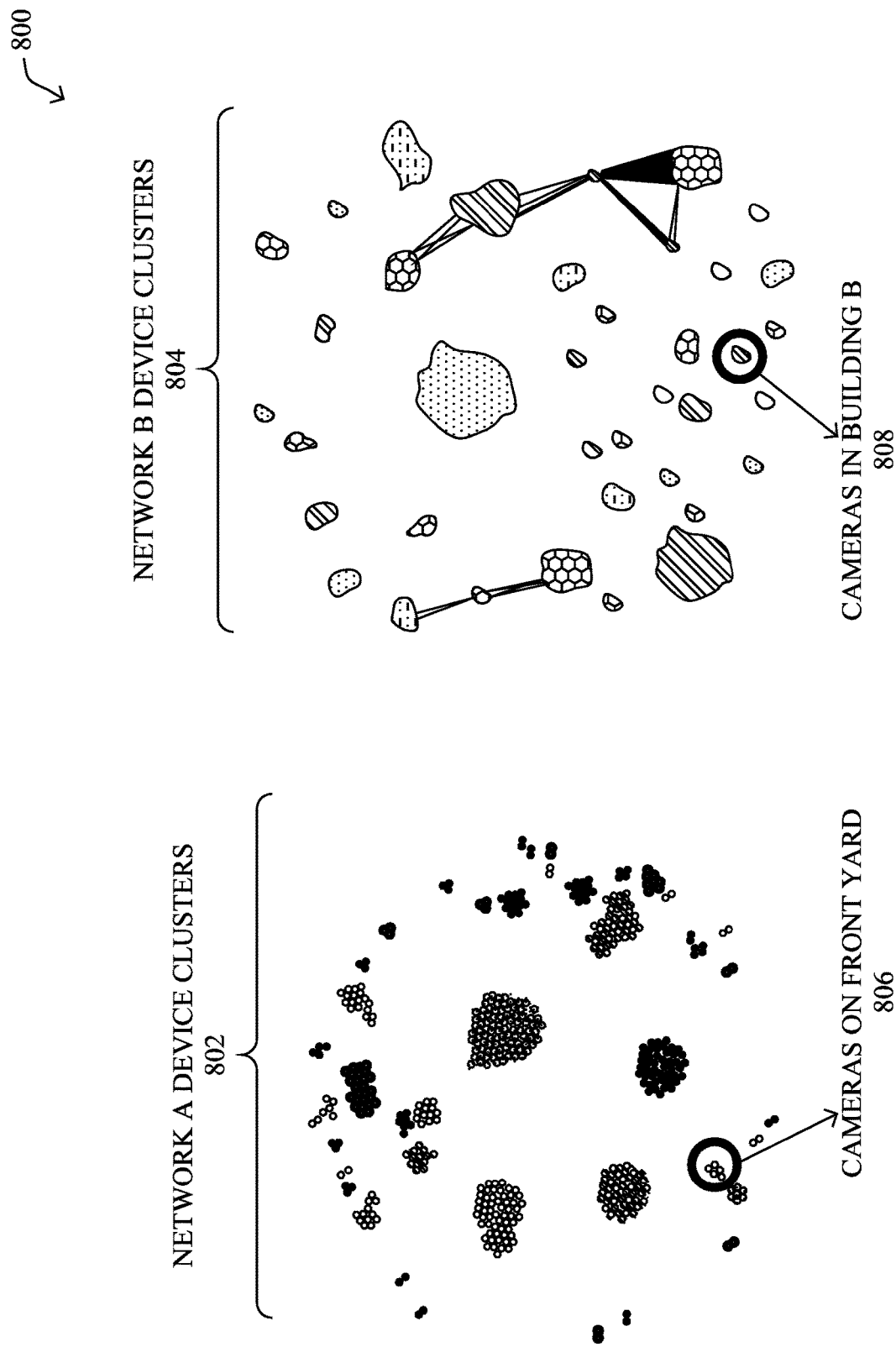
FIG. 8 illustrates an example of the sharing of device cluster data across for device classification across different networks.

As would be appreciated, the labeling of the prototypes introduced herein also allows for the sharing of classification information across different networks. For example, FIG. 8 illustrates an example 800 of the sharing of device cluster data across for device classification across different networks. As shown, assume that network A has device clusters 802 and network B has device clusters 804. Within each of these networks may be cameras that are of the same type, but perhaps are deployed in different locations. For example, the cameras in network A may be in the front yard of a building, whereas the cameras in network B may be located in building B of network B.

In some embodiments, the traffic analysis service can use the device cluster information for both camera clusters 806 and 808, respectively, to form a more generic prototype for the cameras. More specifically, the service may merge the device profile information from the two camera clusters 806 and 808 and form a more generic prototype of the behavior of the camera type. In turn, this more generic camera prototype can be used to identify new cameras in a network as belonging to the same device type.

Figure 9:
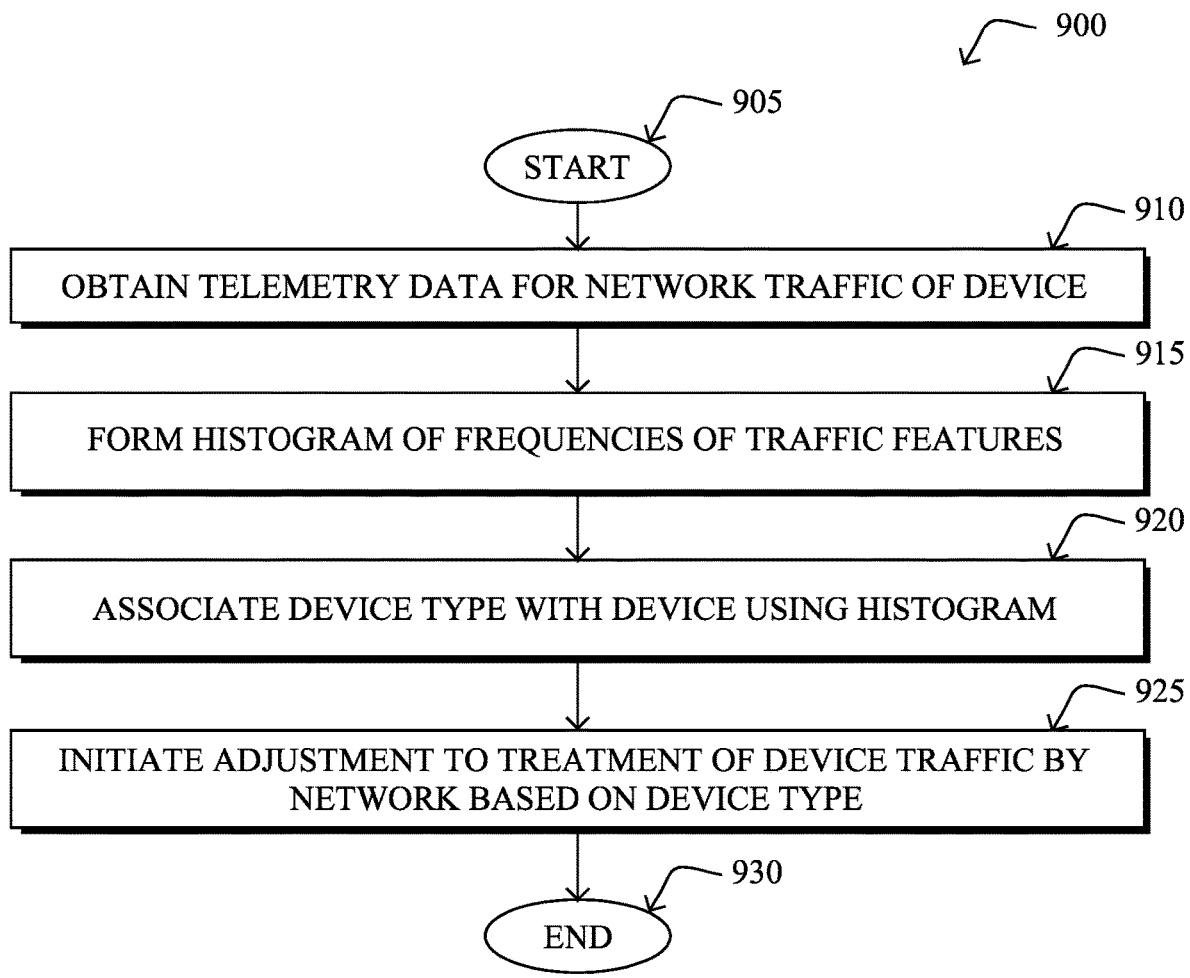
FIG. 9 illustrates an example simplified procedure for the classification of IoT devices based on their network traffic.

FIG. 9 illustrates an example simplified procedure for the classification of IoT devices based on their network traffic, in accordance with one or more embodiments described herein. For example, a non-generic, specifically configured device (e.g., device 200) may perform procedure 900 by executing stored instructions (e.g., process 248), to provide a traffic analysis service to. The procedure 900 may start at step 905, and continues to step 910, where, as described in greater detail above, the traffic analysis service may obtain telemetry data regarding network traffic associated with a device in a network. Such telemetry data may, for example, comprise NetFlow records, IPFIX records, web proxy logs, or the like. In general, the telemetry data may indicate any number of features of the traffic such as, but not limited to, the contacted server hostname, the server IP, the server IP+server port, ApplicationID (as parsed by firewalls), User-Agent string (for web access logs), process hash, etc. that was used by the device.

At step 915, as detailed above, the traffic analysis service may form a histogram of frequencies of the traffic features from the telemetry data for the device. In some embodiments, the traffic features used for the histograms may be indicative of endpoints with which the device communicated (e.g., hostnames, IP addresses, IP addresses+ports, etc.). The service may calculate, in some embodiments, each frequency in the histogram as a ratio of amount of time slots in which the device contacted one of the endpoints to a total number of time slots in which the device communicated with any of the endpoints.

At step 920, the traffic analysis service may associate a device type with the device, as described in greater detail above. In some embodiments, the service may do so by comparing the histogram of the traffic features from the telemetry data to histograms of traffic features associated with other devices. For example, in some embodiments, the service may cluster the histograms of traffic features for other devices into device clusters and, in turn, apply a device type label to representatives of the clusters. In turn, the service may deem the device under consideration to be of the same device type as the cluster representative with which the histogram for the device has the highest similarity measurement.

At step 925, as detailed above, the traffic analysis service may initiate, based on the device type associated with the device, an adjustment to treatment of the traffic associated with the device by the network. For example, the service may provide the device type to a network security system that imposes a certain access control policy or other security policy to the traffic of the device. In a further example, the service may provide the device type to a traffic shaper that controls the prioritization, QoS, or the like of the traffic of the device, based on its device type (e.g., traffic from a safety sensor may receive a higher priority than that of an occupancy sensor used to control lighting, etc.). Procedure 900 then ends at step 930.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for the classification of IoT devices based on their network traffic, it is to be understood that various other adaptations and modifications may be made within the spirit and scope of the embodiments herein. For example, while certain embodiments are described herein with respect to using certain models for purposes of clustering devices, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
obtaining, by a traffic analysis service, telemetry data regarding network traffic associated with a device in a network;
forming, by the traffic analysis service, a histogram of frequencies of the traffic features from the telemetry data for the device, wherein the traffic features are indicative of endpoints with which the device communicated;
associating, by the traffic analysis service, a device type with the device, by comparing the histogram of the traffic features from the telemetry data to histograms of traffic features associated with other devices; and
initiating, by the traffic analysis service and based on the device type associated with the device, an adjustment to treatment of the traffic associated with the device by the network.

2. The method as in claim 1, wherein the traffic features indicative of the endpoints with which the device communicate comprise one or more of: server hostnames, Internet Protocol (IP) addresses, or port numbers.

3. The method as in claim 1, wherein the adjustment to the treatment of the traffic associated with the device by the network comprises one of: enforcing a network security policy regarding the device or enforcing a traffic shaping policy regarding the device.

4. The method as in claim 1, wherein associating the device type with the device, by comparing the histogram of the traffic features from the telemetry data to histograms of traffic features associated with other devices comprises:
applying a clustering process to the histograms of traffic features associated with the other devices, to form device clusters; and
associating the device with a particular one of the device clusters based on a distance metric between the histogram of the traffic features for the device and the particular device cluster, wherein the particular device cluster is labeled with the device type.

5. The method as in claim 4, further comprising:
receiving an indication of the device type from a user interface, in response to providing data regarding the particular device cluster to the user interface; and
labeling the particular device cluster with the device type.

6. The method as in claim 5, further comprising:
using the particular device cluster labeled with the device type to determine the device type of a device in a second network.

7. The method as in claim 1, wherein forming the histogram of frequencies of the traffic features from the telemetry data for the device wherein the traffic features are indicative of endpoints with which the device communicated, comprises:
calculating each frequency in the histogram as a ratio of amount of time slots in which the device contacted one of the endpoints to a total number of time slots in which the device communicated with any of the endpoints.

8. The method as in claim 1, wherein the traffic features further comprise at least one of: an application identifier, a User-Agent string, or a process hash.

9. The method as in claim 1, wherein the device type corresponds to a particular operating system executed by the device.

10. An apparatus, comprising:
one or more network interfaces to communicate with a network;
a processor coupled to the network interfaces and configured to execute one or more processes; and
a memory configured to store a process executable by the processor, the process when executed configured to:
obtain telemetry data regarding network traffic associated with a device in a network;
form a histogram of frequencies of the traffic features from the telemetry data for the device, wherein the traffic features are indicative of endpoints with which the device communicated;

associate a device type with the device, by comparing the histogram of the traffic features from the telemetry data to histograms of traffic features associated with other devices; and initiate, based on the device type associated with the device, an adjustment to treatment of the traffic associated with the device by the network.

11. The apparatus as in claim 10, wherein the traffic features indicative of the endpoints with which the device communicate comprise one or more of: server hostnames, Internet Protocol (IP) addresses, or port numbers.

12. The apparatus as in claim 10, wherein the adjustment to the treatment of the traffic associated with the device by the network comprises one of: enforcing a network security policy regarding the device or enforcing a traffic shaping policy regarding the device.

13. The apparatus as in claim 10, wherein the apparatus associates the device type with the device, by comparing the histogram of the traffic features from the telemetry data to histograms of traffic features associated with other devices by:

applying a clustering process to the histograms of traffic features associated with the other devices, to form device clusters; and associating the device with a particular one of the device clusters based on a distance metric between the histogram of the traffic features for the device and the particular device cluster, wherein the particular device cluster is labeled with the device type.

14. The apparatus as in claim 13, wherein the process when executed is further configured to:

receive an indication of the device type from a user interface, in response to providing data regarding the particular device cluster to the user interface; and label the particular device cluster with the device type.

15. The apparatus as in claim 14, wherein the process when executed is further configured to:

use the particular device cluster labeled with the device type to determine the device type of a device in a second network.

16. The apparatus as in claim 10, wherein the apparatus forms the histogram of frequencies of the traffic features from the telemetry data for the device wherein the traffic features are indicative of endpoints with which the device communicated, by:

calculating each frequency in the histogram as a ratio of amount of time slots in which the device contacted one of the endpoints to a total number of time slots in which the device communicated with any of the endpoints.

17. The apparatus as in claim 10, wherein the traffic features further comprise at least one of: an application identifier, a User-Agent string, or a process hash.

18. The apparatus as in claim 10, wherein the device type corresponds to a particular operating system executed by the device.

19. A tangible, non-transitory, computer-readable medium storing program instructions that cause a service to execute a process comprising:

obtaining, by the service, telemetry data regarding network traffic associated with a device in a network;

forming, by the service, a histogram of frequencies of the traffic features from the telemetry data for the device, wherein the traffic features are indicative of endpoints with which the device communicated;

associating, by the service, a device type with the device, by comparing the histogram of the traffic features from the telemetry data to histograms of traffic features associated with other devices; and initiating, by the service and based on the device type associated with the device, an adjustment to treatment of the traffic associated with the device by the network.

20. The computer-readable medium as in claim 19, wherein associating the device type with the device, by comparing the histogram of the traffic features from the telemetry data to histograms of traffic features associated with other devices comprises:

applying a clustering process to the histograms of traffic features associated with the other devices, to form device clusters; and associating the device with a particular one of the device clusters based on a distance metric between the histogram of the traffic features for the device and the particular device cluster, wherein the particular device cluster is labeled with the device type.

* * * * *

UNITED STATES PATENT AND TRADEMARK OFFICE
CERTIFICATE OF CORRECTION

PATENT NO. : 10,749,770 B2
APPLICATION NO. : 16/156020
DATED : August 18, 2020
INVENTOR(S) : Jan Kohout et al.

Page 1 of 1

It is certified that error appears in the above-identified patent and that said Letters Patent is hereby corrected as shown below:

In the Specification

Column 11, Line 58, please amend as shown:
In other words, the $\delta$-medoid approach introduced herein Signed and Sealed this
Twenty-second Day of December, 2020

Andrei Iancu
*Director of the United States Patent and Trademark Office*